United States Patent
Tezuka et al.

(10) Patent No.: US 8,741,456 B2
(45) Date of Patent: Jun. 3, 2014

(54) BATTERY TEMPERATURE CONTROL APPARATUS AND BATTERY TEMPERATURE CONTROL METHOD

(71) Applicant: NEC Corporation, Tokyo (JP)

(72) Inventors: Kazunari Tezuka, Sagamihara (JP); Mitsunori Ishii, Sagamihara (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/687,460

(22) Filed: Nov. 28, 2012

(65) Prior Publication Data

US 2013/0089758 A1   Apr. 11, 2013

Related U.S. Application Data

(62) Division of application No. 11/577,797, filed as application No. PCT/JP2005/016947 on Sep. 14, 2005, now Pat. No. 8,338,011.

(30) Foreign Application Priority Data

Oct. 29, 2004  (JP) ................................. 2004-316036

(51) Int. Cl.
    *H01M 10/50* (2006.01)

(52) U.S. Cl.
    USPC .............................. 429/50; 429/62; 320/150

(58) Field of Classification Search
    USPC ...................................... 429/62, 50; 320/150
    See application file for complete search history.

(56) References Cited

U.S. PATENT DOCUMENTS

| 4,415,847 A | 11/1983 | Galloway |
| 5,585,204 A | 12/1996 | Oshida et al. |
| 5,652,500 A | 7/1997 | Kadouchi et al. |
| 2003/0030414 A1 | 2/2003 | Suzuki |
| 2003/0080714 A1 | 5/2003 | Inoue et al. |

FOREIGN PATENT DOCUMENTS

| JP | 09-289042 A | 11/1997 |
| JP | 2000-036327 A | 2/2000 |
| JP | 2002-051479 A | 2/2002 |
| JP | 2002-063946 A | 2/2002 |

OTHER PUBLICATIONS

McMillan, Gregory et al., Process/Industrial Instruments and Controls Handbook, 1999, McGraw-Hill, 5th Edition, p. 2-11 and 2-12.
Buchmann, Isidor, Batteries in a Portable World, 2001, Chapter 9.

*Primary Examiner* — Ula C Ruddock
*Assistant Examiner* — Frank Chernow
(74) *Attorney, Agent, or Firm* — Sughrue Mion, PLLC

(57) ABSTRACT

A battery temperature control apparatus capable of controlling the temperature of a battery to reach a suitable condition is provided. Thermal capacity determining unit 61, based on the temperature of battery 1 detected by battery temperature detector 2 and a target temperature stored in storage unit 5, determines the thermal capacity necessary for setting the temperature of battery 1 to the target temperature. Temperature regulating ability determining unit 62, based on the temperature of battery 1 detected by battery temperature detector 2 and the temperature of the temperature regulating medium detected by medium temperature detector 4, determines the temperature regulating ability of fan 3. Flow rate controller 63, based on the thermal capacity determined by thermal capacity determining unit 61 and the temperature regulating ability determined by temperature regulating ability determining unit 62, controls the flow rate of the temperature regulating medium sent by the fan. The temperature of battery 1 becomes close to the target temperature due to the temperature regulating medium sent from fan 3.

1 Claim, 3 Drawing Sheets

BATTERY TEMPERATURE CONTROL APPARATUS AND BATTERY TEMPERATURE CONTROL METHOD

CROSS REFERENCE TO RELATED APPLICATIONS

This application is a Divisional of U.S. patent application Ser. No. 11/577,797, filed on Apr. 23, 2007, which is a National Stage of International Application No. PCT/JP2005/016947, filed on Sep. 14, 2005, which claims priority from Japanese Patent Application No. 2004-316036 filed Oct. 29, 2004, the contents of all of which are incorporated herein by reference in their entirety.

BACKGROUND OF THE INVENTION

1. Technical Field

The present invention relates to a battery temperature control apparatus and a battery temperature control method, and relates to a battery temperature control apparatus and a battery temperature control method for controlling the temperature of a battery that is used as a power source for an electric vehicle or a hybrid vehicle, for example.

2. Background Art

Conventionally, there have been known battery temperature control apparatuses for controlling the temperature of a battery mounted on an electric vehicle or a hybrid vehicle, for example.

JP2000-36327A discloses a battery cooling fan controller for controlling the flow rate of a cooling fan based on the temperature of a battery. This battery cooling fan controller determines the flow rate of the cooling fan based on the temperature of the battery only when the battery temperature is higher than a lower side determining temperature and lower than a higher side determining temperature.

JP2002-63946A discloses a battery system for controlling the flow rate of a cooling fan and its operating time based on the difference between the outside temperature and the battery temperature.

Patent document 1: JP2000-36327A
Patent document 2: JP2002-63946A

DISCLOSURE OF THE INVENTION

Problems to be Solved by the Invention

In the battery cooling fan controller disclosed in JP2000-36327A, when the temperature of the battery is higher than the lower side determining temperature and lower than the higher side determining temperature, the flow rate of the cooling fan is determined based on the temperature of the battery only. Accordingly, when the battery temperature is higher than the lower side determining temperature and lower than the higher side determining temperature, the flow rate of the cooling fan will not change if the difference between the temperature of the battery and the temperature of the outside air varies. Therefore, there occurs the problem that it is difficult to control the temperature of the battery to be at an optimal condition.

In the battery system disclosed in JP2002-63946A, the flow rate of the cooling fan and its operating time are controlled based on the difference between the temperature of the outside air and the battery temperature. Accordingly, it is possible to solve the problem occurring in the battery cooling fan controller disclosed in JP2000-36327A.

However, in the battery system disclosed in JP2002-63946A, if the battery temperature varies, the flow rate and the operating time of the cooling fan will not change when the difference between the outside air temperature and the battery temperature is constant. Therefore, if, for example, the temperature of the battery is low, it may mean that the battery has been excessively cooled. Thus, it is difficult to control the battery temperature to be at an optimal condition.

It should be noted that in a rechargeable battery, the performance of a battery degrades if the temperature of the battery becomes too low while the life of the battery becomes shorter if the temperature of the battery becomes too high.

The object of the present invention is to provide a battery temperature control apparatus and a battery temperature control method capable of controlling the temperature of a battery into a suitable condition.

Means for Solving the Problems

In order to achieve the above object, a battery temperature control apparatus according to the present invention is a battery temperature control apparatus for controlling the temperature of a battery, and includes: a battery temperature detector for detecting the temperature of the battery; a temperature regulator for regulating the temperature of the battery by sending a temperature regulating medium to the battery; a medium temperature detector for detecting the temperature of the temperature regulating medium; a storage unit for storing the target temperature of the battery; a control unit, based on the temperature of the battery detected by the battery temperature detector, the temperature of the temperature regulating medium detected by the medium temperature detector and the target temperature stored in the storage unit, for controlling the flow rate of the temperature regulating medium that is sent by the temperature regulator so that the temperature of the battery becomes close to the target temperature.

Also, a battery temperature control method according to the present invention is a battery temperature control method which is performed by a battery temperature control apparatus for controlling the temperature of a battery, and includes: a battery temperature detecting step for detecting the temperature of the battery; a medium temperature detecting step for detecting the temperature of a temperature regulating medium to be sent to the battery in order to regulate the battery temperature; a storing step for storing the target temperature of the battery; and a control step, based on the temperature of the battery, the temperature of the temperature regulating medium and the target temperature, for controlling the flow rate of the temperature regulating medium so that the temperature of the battery becomes close to the target temperature.

According to the invention, the flow rate of the temperature regulating medium is controlled based on the temperature of the battery, the temperature of the temperature regulating medium and the target temperature so that the temperature of the battery will become close to the target temperature. Accordingly, it is possible to adjust the temperature of the battery based on the relative relationship between the temperature of the battery, the temperature of the temperature regulating medium and the target temperature. Thereby, the temperature of the battery can be easily adjusted to the target temperature. As a result, it is possible to control the battery temperature so that the temperature reaches a suitable condition.

Here, control is preferably made by determining the thermal capacity necessary for setting the temperature of the battery to the target temperature, based on the temperature of the battery and the target temperature; determining the temperature regulating ability, based on the temperature of the battery and the temperature of the temperature regulating medium; and controlling the flow rate of the temperature regulating medium, based on the determined thermal capacity and temperature regulating ability.

According to the present invention, it is possible to control the battery temperature to reach a suitable condition based on the relative relationship between the temperature of the battery and the target temperature and the relative relationship between the temperature of the battery and the temperature of the temperature regulating medium.

Control is preferably made by calculating the flow rate of the temperature regulating medium based on the thermal capacity and the temperature regulating ability, correcting the calculated flow rate in accordance with the level of the temperature regulating ability, and changing the flow rate of the temperature regulating medium to the corrected flow rate.

According to the present invention, it is possible to prevent vibration of the battery temperature control apparatus, that occurs when the flow rate of the temperature regulating medium is excessively high. It is also possible to prevent deterioration of temperature control efficiency due to an excessive flow rate of the temperature regulating medium when the temperature regulating ability is low.

Further, it is preferred that on-and-off permission conditions for the temperature regulator are set up based on the temperature of the battery, the temperature of the temperature regulating medium and the target temperature, and that the on-and-off permission conditions for the temperature regulator involve hysteresis.

According to the present invention, it is possible to prevent the occurrence of on/off hunting of the temperature regulator due to detection accuracy of the battery temperature.

It is preferred that the temperature regulating medium is a gas or liquid.

It is also preferred that the internal resistance of the battery is detected so as to control the target temperature based on the detected internal resistance.

As the internal resistance of the battery varies, performance of the battery also varies. Therefore, according to the present invention, it is possible to prevent variation of the performance of the battery that is caused by changes in the internal resistance of the battery.

Also, it is preferred that the target temperature is gradually increased as the internal resistance increases.

As the internal resistance of the battery increases, the performance of the battery degrades. The performance of the battery is improved as the temperature of the battery becomes higher. Therefore, according to the present invention, it is possible to prevent deterioration of the performance of the battery as the internal resistance of the battery increases.

Effect of the Invention

According to the present invention, it is possible to control the battery temperature to reach a suitable condition.

Figure 1:
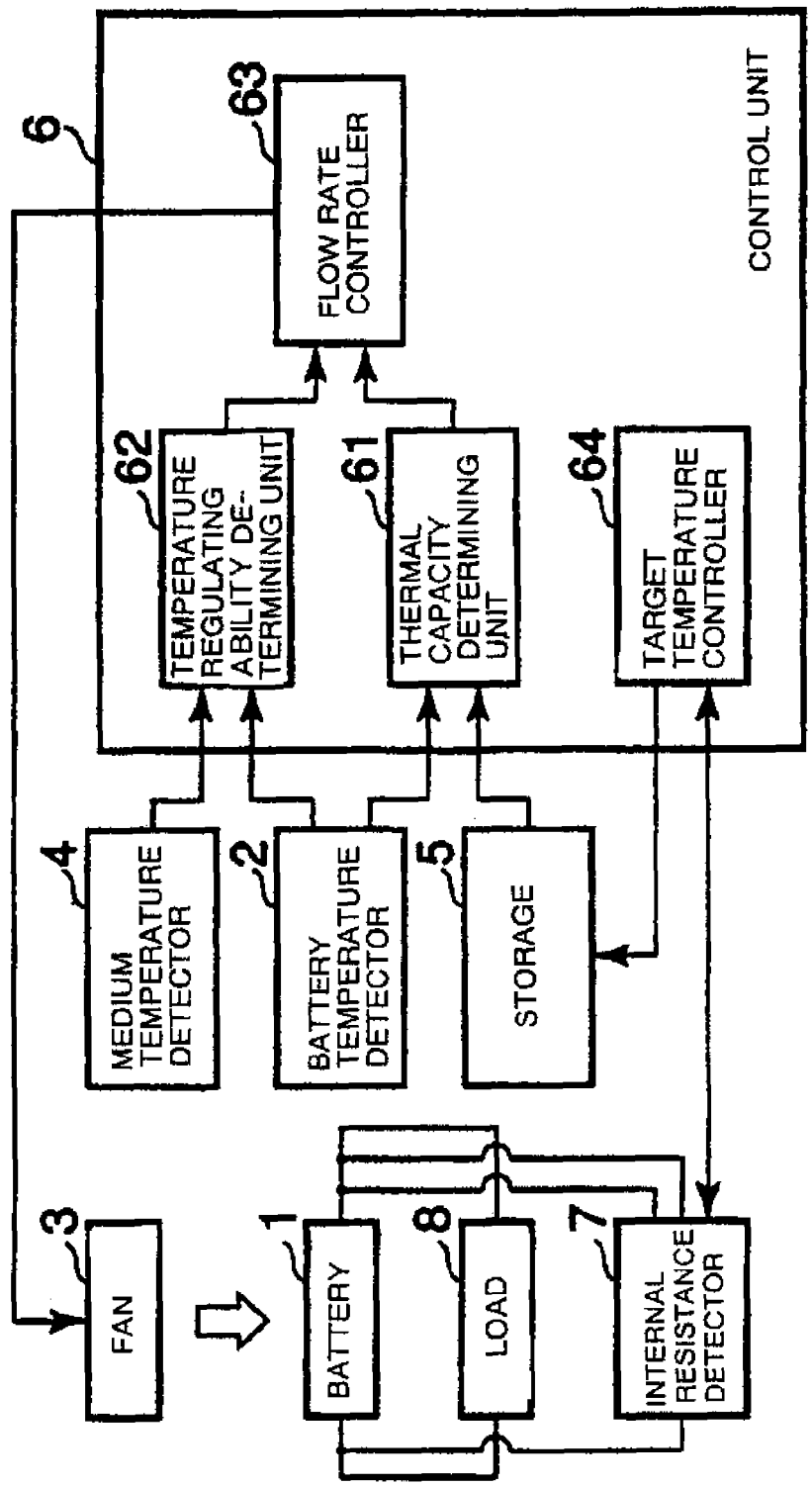
FIG. 1 is a block diagram showing a battery temperature control apparatus according to one embodiment of the present invention.

DESCRIPTION OF REFERENCE NUMERALS 1 battery
2 battery temperature detector
3 fan
4 medium temperature detector
5 storage unit
6 control unit
61 thermal capacity determining unit
62 temperature regulating ability determining unit
63 flow rate controller
64 target temperature controller
7 internal resistance detector
8 load

BEST MODE FOR CARRYING OUT THE INVENTION

Next, the embodiment of the present invention will be described with reference to the drawings.

FIG. 1 is a block diagram showing a battery temperature control apparatus according to one embodiment of the present invention.

In FIG. 1, the battery temperature control apparatus includes battery 1, battery temperature detector 2, fan 3, medium temperature detector 4, storage unit 5, control unit 6 and internal resistance detector 7. Control unit 6 includes thermal capacity determining unit 61, temperature regulating ability determining unit 62, flow rate controller 63 and target temperature controller 64.

Battery 1 is a rechargeable assembled battery. Battery 1 is composed of a plurality of unit cells connected in series. The performance of battery 1 lowers if the temperature of battery 1 becomes too low and the life of battery 1 becomes short if the temperature of battery 1 becomes too high. Battery 1 is used as a power source to load 8. Load 8 is a load for driving a vehicle, for example.

In the present embodiment, battery 1 is mounted on a hybrid vehicle, electric vehicle or fuel-cell vehicle. Battery 1 is used as an electric power source for supplying the necessary electric power for starting the engine and driving the vehicle. Battery 1 is charged and discharged so that the SOC (state of charge) falls within a predetermined range. Charge and discharge of battery 1 is controlled by a battery controller (not shown).

Battery temperature detector 2 detects the temperature of battery 1.

Fan 3 is used as a temperature regulator. Fan 3 sends air (gas) to battery 1 to regulate the temperature of battery 1. Here, air (gas) is one example of a temperature regulating medium.

Medium temperature detector 4 detects the temperature of the temperature regulating medium. In the present embodiment, medium temperature detector 4 detects the temperature of the gas (air) to be blown from fan 3.

Storage unit 5 stores the target temperature of battery 1. In other words, the target temperature of battery 1 is set at storage unit 5. Here, the target temperature of battery 1 may be set in storage unit 5 beforehand by the manufacturer, or may set by target temperature controller 64 at a value in accordance with the internal resistance of battery 1.

Control unit 6 controls the flow rate of gas (air) that is sent by fan 3 based on the temperature of battery 1 detected by battery temperature detector 2, the temperature of the temperature regulating medium detected by medium temperature detector 4 and the target temperature stored in storage unit 5 so that the temperature of battery 1 will approach the target temperature.

Here, control unit 6 is constituted of a CPU, ROM and RAM, for example. The ROM stores the operating program for specifying the operation of control unit 6. The CPU loads the operating program and executes the loaded operating program to thereby effect various operations.

In the present embodiment, the CPU executes the operating program to thereby realize thermal capacity determining unit 61, temperature regulating ability determining unit 62, flow rate controller 63 and target temperature controller 64. However, thermal capacity determining unit 61, temperature regulating ability determining unit 62, flow rate controller 63 and target temperature controller 64 may be configured by hardware.

Thermal capacity determining unit 61 determines the thermal capacity necessary for changing the temperature of battery 1 to the target temperature, based on the temperature of battery 1 and the target temperature of battery 1.

For example, thermal capacity determining unit 61 calculates the formula: (the temperature of battery 1–target temperature)×(specific heat of battery 1) to determine the necessary thermal capacity. Here, thermal capacity determining unit 61 stores the specific heat of battery 1 beforehand.

Temperature regulating ability determining unit 62 determines the temperature regulating ability of fan 3 based on the temperature of battery 1 and the temperature of the temperature regulating medium. In other words, temperature regulating ability determining unit 62 determines the temperature regulating ability of the temperature regulating medium based on the temperature of battery 1 and the temperature of the temperature regulating medium.

For example, temperature regulating ability determining unit 62 calculates the formula: (the temperature of battery 1–the temperature of the temperature regulating medium) to determine the temperature regulating ability of fan 3 at the standard flow rate, or the temperature regulating ability of the temperature regulating medium at the standard flow rate.

Flow rate controller 63, based on the thermal capacity determined by thermal capacity determining unit 61 and the temperature regulating ability determined by temperature regulating ability determining unit 62, determines the flow rate of the temperature regulating medium that is sent by fan 3.

For example, flow rate controller 63 calculates the formula: (the thermal capacity determined by thermal capacity determining unit 61)/(the temperature regulating ability determined by temperature regulating ability determining unit 62) to determine the ratio of the flow rate of fan 3 to the standard flow rate. Here, flow rate controller 63 stores the standard flow rate beforehand. Flow rate controller 63 determines the flow rate of the temperature regulating medium that is sent by fan 3 by multiplying the standard flow rate by the determined ratio. Flow rate controller 63 corrects the determined flow rate in accordance with the level of the temperature regulating ability.

Flow rate controller 63 controls the flow rate of the temperature regulating medium that is sent by fan 3 so that fan 3 will send the temperature regulating medium to battery 1 at the corrected flow rate.

Flow rate controller 63 determines that the temperature adjustment by fan 3 is not fully effective and stops fan 3 when the value of (thermal capacity determined by thermal capacity determining unit 61)/(the temperature regulating ability determined by temperature regulating ability determining unit 62) is a negative value.

Here, when the temperature of battery 1 is higher than the target temperature and the temperature of the temperature regulating medium is higher than the temperature of battery 1 and when the temperature of battery 1 is lower than the target temperature and the temperature of the temperature regulating medium is lower than the temperature of battery 1, the value of (thermal capacity determined by thermal capacity determining unit 61)/(the temperature regulating ability determined by temperature regulating ability determining unit 62) becomes a negative value.

Internal resistance detector 7 detects the internal resistance of battery 1. For example, internal resistance detector 7 determines the internal resistance of battery 1 by, for example, calculating a formula: internal resistance $Z=\Delta V/\cdot \Delta I$, where $\Delta V$ is the voltage change of battery 1 detected when the current value of battery 1 is changed by $\Delta I$ in a short period.

Target temperature controller 64, based on the internal resistance detected by internal resistance detector 7, controls the target temperature stored in storage unit 5. Specifically, target temperature controller 64 gradually increases the target temperature as the internal resistance detected by internal resistance detector 7 becomes greater.

Next, the operation will be described.

Figure 2:
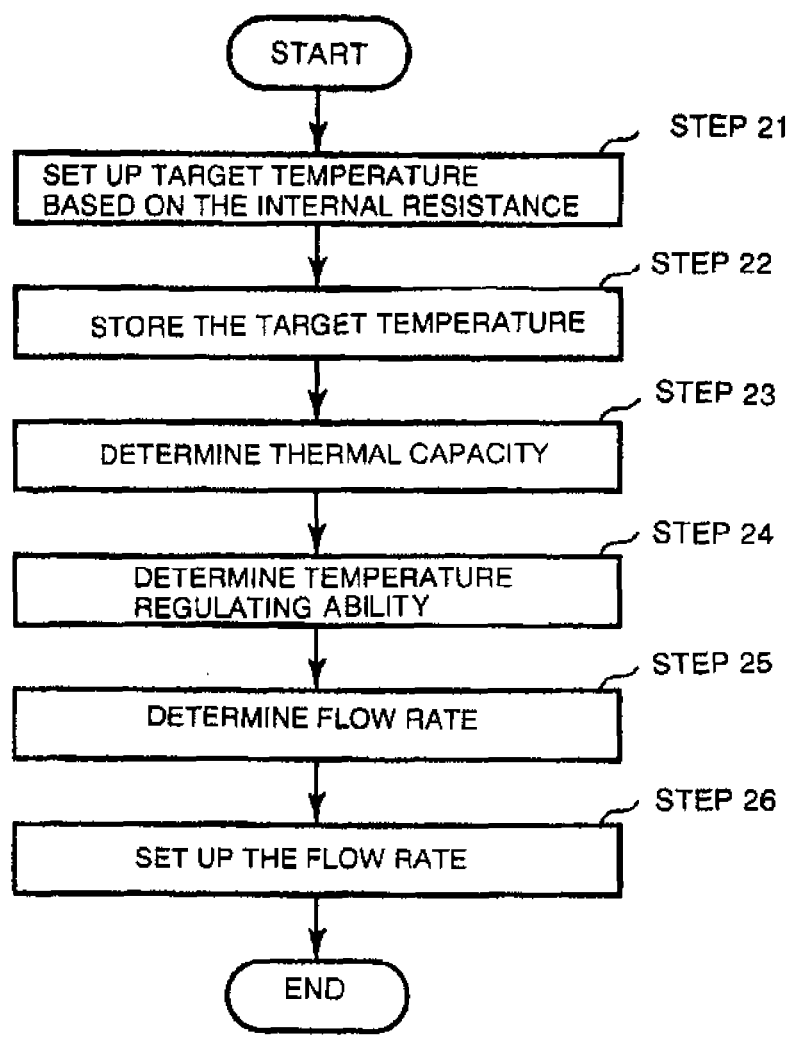
FIG. 2 is a flow chart for illustrating the operation of the battery temperature control apparatus shown in FIG. 1.

FIG. 2 is a flow chart for explaining the operation of control unit 6. The temperature control operation effected by control unit 6 will hereinbelow be described with reference to FIG. 2.

At Step 21, target temperature controller 64 causes internal resistance detector 7 to detect the internal resistance of battery 1. After detecting the internal resistance of battery 1, internal resistance detector 7 outputs the detected internal resistance of battery 1 to target temperature controller 64. Target temperature controller 64, upon receipt of the internal resistance of battery 1, sets up a target temperature based on the internal resistance of battery 1. Here, target temperature controller 64 sets up a target temperature such that the target temperature will gradually become higher as the internal resistance of battery 1 becomes greater.

When Step 21 is completed, target temperature controller 64 executes Step 22.

At Step 22, target temperature controller 64 deletes the target temperature previously stored in storage unit 5, then stores the target temperature that is newly set up at Step 21 into storage unit 5.

When Step 22 is completed, thermal capacity determining unit 61 executes Step 23.

At Step 23, thermal capacity determining unit 61, based on the temperature of battery 1 detected by battery temperature detector 2 and the target temperature stored in storage unit 5, determines the thermal capacity required to bring the temperature of battery 1 to the target temperature. Specifically, thermal capacity determining unit 61 calculates the formula: (the temperature of battery 1–the target temperature)×(specific heat of battery 1) to determine the necessary thermal capacity.

When Step 23 is completed, temperature regulating ability determining unit 62 executes Step 24.

At Step 24, temperature regulating ability determining unit 62, based on the temperature of battery 1 detected by battery temperature detector 2 and the temperature of the temperature regulating medium detected by medium temperature detector 4, determines the temperature regulating ability of fan 3.

Specifically, temperature regulating ability determining unit 62 calculates the formula: (the temperature of battery 1–the temperature of the temperature regulating medium) to determine the temperature regulating ability of fan 3 at the standard flow rate.

When Step 24 is completed, flow rate controller 63 executes Step 25.

At Step 25, flow rate controller 63, based on the thermal capacity determined by thermal capacity determining unit 61 and the temperature regulating ability determined by temperature regulating ability determining unit 62, controls the flow rate of the temperature regulating medium [gas (air)] that is sent by fan 3.

Specifically, flow rate controller 63 calculates the formula: (the thermal capacity determined by thermal capacity determining unit 61)/(the temperature regulating ability determined by temperature regulating ability determining unit 62) to determine the ratio of the flow rate of fan 3 to the standard flow rate. Flow rate controller 63 determines the flow rate of the temperature regulating medium that is sent by fan 3, by multiplying the standard flow rate by the determined ratio.

Here, in the formula: (the thermal capacity determined by thermal capacity determining unit 61)/(the temperature regulating ability determined by temperature regulating ability determining unit 62), the temperature regulating ability is given as (battery temperature–temperature regulating medium temperature).

Therefore, if the difference between the battery temperature and the temperature of the temperature regulating medium is small, the calculation result of the flow rate of the temperature regulating medium becomes large. In this condition, even if the battery temperature or the temperature of the temperature regulating medium changes slightly, the flow rate of the temperature regulating medium changes greatly. As a result, vibration may take place in the battery temperature control apparatus. Also, if the flow rate of the temperature regulating medium is excessively increased when the temperature regulating ability is low, the temperature control efficiency degrades.

To solve this problem, at Step 25, flow rate controller 63 corrects the determined flow rate of the temperature regulating medium in accordance with the level of the ability for regulating temperature.

Figure 3:
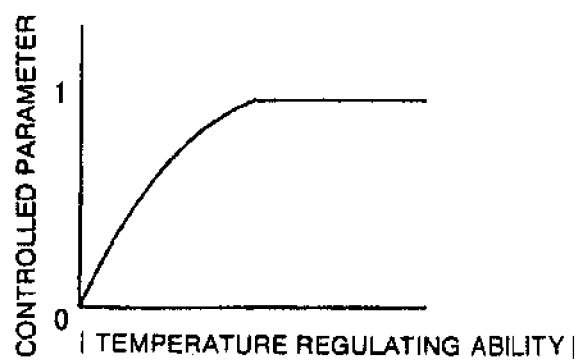
FIG. 3 is an illustrative chart showing one example of a control constant in accordance with the level of the ability for regulating temperature.

For example, flow rate controller 63 corrects the flow rate by multiplying the determined flow rate of the temperature regulating medium by a control constant that corresponds to the level of the ability for regulating temperature. FIG. 3 is an illustrative chart showing one example of a control constant (parameter) that depends on the level of the ability for regulating temperature.

Figure 4:
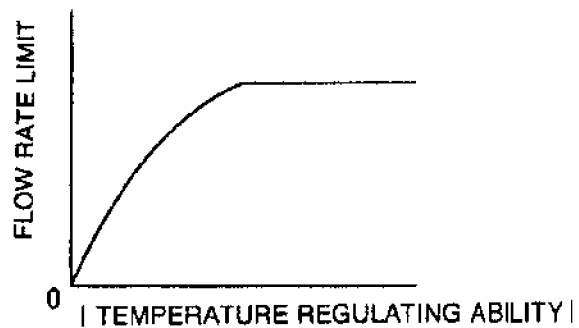
FIG. 4 is an illustrative chart showing one example of a flow rate limit for a temperature regulating medium in accordance with the level of the ability for regulating temperature.

Alternatively, flow rate controller 63 may previously store a flow rate limit of the temperature regulating medium in accordance with the level of the ability for regulating temperature, and if the determined flow rate of the temperature regulating medium exceeds the flow rate limit, flow rate controller 63 corrects the determined flow rate of the temperature regulating medium to the flow rate limit. FIG. 4 is an illustrative chart showing one example of the flow rate limit of the temperature regulating medium that depends on the level of the ability for regulating temperature.

As Step 25 is completed, flow rate controller 63 executes Step 26.

At Step 26, flow rate controller 63 controls the flow rate of the temperature regulating medium sent by fan 3 so that fan 3 can send the temperature regulating medium (gas (air)) to battery 1 at the flow rate determined at Step 25.

Accordingly, the temperature of battery 1 approaches the target temperature as a result of the temperature regulating medium (gas (air)) sent by fan 3.

When the value of (thermal capacity determined by thermal capacity determining unit 61)/(the temperature regulating ability determined by temperature regulating ability determining unit 62) is negative, flow rate controller 63 determines that temperature adjustment by fan 3 is not fully efficient and stops fan 3.

Additionally, control unit 6 may continuously repeat the operation shown in FIG. 2, or may repeat the operation at intervals of a predetermined period, for example.

Also, the present embodiment may be preferably modified as follows, for example.

Flow rate controller 63 sets up conditions for permitting fan 3 to turn on and off, based on the battery temperature, the temperature of the temperature regulating medium and the target temperature. For example, in order to prevent on/off hunting of fan 3 due to detection accuracy of the temperature of battery 1, flow rate controller 63 sets up hysteresis as the fan 3's on-and-off permission conditions.

For example, when the temperature of battery 1 is higher than the temperature of the temperature regulating medium, flow rate controller 63 permits fan 3 to operate if the temperature of battery 1 is equal to or higher than (the target temperature+$\Delta T1$) while flow rate controller 63 prohibits fan 3 from operating when the temperature of battery 1 becomes equal to or lower than (the target temperature+$\Delta T2$). Here, $\Delta T1 > \Delta T2$.

On the other hand, when the temperature of battery 1 is lower than the temperature of the temperature regulating medium, flow rate controller 63 permits fan 3 to operate if the temperature of battery 1 is equal to or lower than (the target temperature–$\Delta T3$) while flow rate controller 63 prohibits fan 3 from operating when the temperature of battery 1 becomes equal to or higher than (the target temperature–$\Delta T4$). Here, $\Delta T3 > \Delta T4$.

According to the present embodiment, based on the temperature of battery 1, the temperature of the temperature regulating medium and the target temperature, the airflow rate of fan 3 is controlled so that the temperature of battery 1 will approach the target temperature. Accordingly, based on the relative relationship between the temperature of the battery, the temperature of the temperature regulating medium and the target temperature, the temperature of battery 1 can be controlled. As a result, the temperature of battery 1 can be easily adjusted to the target temperature. Accordingly, it is possible to control the battery temperature to reach a suitable condition.

Further, since the temperature of battery 1 can be controlled to reach a suitable condition, when battery 1 is used as an electric power source for the driving motor of an electric vehicle or hybrid vehicle, it is possible to stabilize the running performance of the electric vehicle or hybrid vehicle.

Moreover, in the present embodiment, the thermal capacity necessary for changing the temperature of battery 1 into the target temperature is determined based on the temperature of battery 1 and the target temperature. Also, the temperature regulating ability is determined based on the temperature of battery 1 and the temperature of temperature regulating medium. Further, based on the determined thermal capacity and temperature regulating ability, the flow rate of the temperature regulating medium is controlled. Accordingly, it is possible to control the battery temperature to reach a suitable condition, based on the relative relationship between the temperature of battery 1 and the target temperature, and the relative relationship between the temperature of battery 1 and the temperature of the temperature regulating medium.

Also, in the present embodiment, in order to control the temperature of battery 1 to reach a suitable condition, the airflow rate of fan 3 can be optimally controlled. It is therefore possible to prevent waste air blowing from fan 3. Accordingly, it is possible to reduce the sound of fan 3 that results from blowing wasted air. It is also possible to prevent the wasteful use of energy to drive fan 3 that results from blowing wasted air.

Also, in the present embodiment, based on the thermal capacity determined by thermal capacity determining unit 61 and the temperature regulating ability determined by the temperature regulating ability determining unit, the flow rate of the temperature regulating medium is calculated. Further, the calculated flow rate is corrected in accordance with the level of the ability for regulating temperature. The flow rate of the temperature regulating medium is adjusted to the corrected flow rate. Accordingly, it is possible to prevent vibration of the battery temperature control apparatus due to the excessive flow rate of the temperature regulating medium. It is also possible to prevent deterioration of the temperature control efficiency due to the excessive flow rate of the temperature regulating medium when the temperature regulating ability is low.

Further, in the present embodiment, the internal resistance of battery 1 is detected, and based on the detected internal resistance the target temperature is controlled. As the internal resistance of battery 1 varies, the performance of battery 1 also varies. Therefore, according to the present embodiment, it is possible to prevent variation in the performance of battery 1 depending on the change of the internal resistance of battery 1.

Also, in the present embodiment, as the internal resistance of battery 1 becomes greater, the target temperature is gradually increased. As the internal resistance of the battery increases, the performance of the battery degrades. The performance of the battery is improved as the temperature of the battery becomes higher. Therefore, according to the present embodiment, it is possible to prevent deterioration of the performance of battery 1 that would result from the increase in the internal resistance of battery 1.

Also, if control unit 6 repeats the above temperature control operation, it is possible to constantly keep the temperature of battery 1 at around the target temperature. Accordingly, it is possible to use battery 1 in an optimal condition at any time.

In the above embodiment, gas (air) is used as the temperature regulating medium. However, the temperature regulating medium is not limited to gas (air) and any other material can be used as appropriate. For example, a liquid may be used as a temperature regulating medium. In this case, a liquid ejector is used as a temperature regulator, and medium temperature detector 4 detects the temperature of the liquid.

Also, in the above embodiment, although the target temperature is modified in accordance with the internal resistance of battery 1, the target temperature does not need be changed. In this case, internal resistance detector 7 and target temperature controller 64 shown in FIG. 1 can be omitted and Step 21 and Step 22 shown in FIG. 2 may be omitted.

In the embodiment described heretofore, the illustrated configuration is a mere example, and the present invention should not be limited to the above configuration.

The invention claimed is:

1. A battery temperature control method for controlling a temperature of a battery, comprising:
   detecting the temperature of the battery;
   detecting a temperature of a temperature regulating medium to be sent to the battery in order to regulate the temperature of the battery; and
   controlling a flow rate of the temperature regulating medium based on the temperature of the battery, the temperature of the temperature regulating medium a target temperature and the specific heat of the battery such that the temperature of the battery becomes close to the target temperature, wherein controlling the flow rate includes:
   determining a thermal capacity necessary for setting the temperature of the battery to the target temperature, by multiplying the specific heat of the battery by a value that is generated by subtracting the target temperature from the temperature of the battery;
   determining a temperature regulating ability of the temperature regulating medium at a standard flow rate, by subtracting the temperature of the temperature regulating medium from the temperature of the battery;
   dividing the thermal capacity by the temperature regulating ability in order to determine a ratio of the flow rate of the temperature regulating medium to the standard flow rate,
   determining the flow rate of the temperature regulating medium by multiplying the standard flow rate by the ratio, and
   managing the flow rate of the temperature regulating medium such that the flow rate of the temperature regulating medium that is determined is sent to the battery.

* * * * *